(12) United States Patent
Yang et al.

(10) Patent No.: US 10,977,852 B2
(45) Date of Patent: Apr. 13, 2021

(54) VR PLAYING METHOD, VR PLAYING DEVICE, AND VR PLAYING SYSTEM

(71) Applicant: SHENZHEN SKYWORTH-RGB ELECTRONIC CO., LTD., Guangdong (CN)

(72) Inventors: Fan Yang, Guangdong (CN); Ying Liu, Guangdong (CN); Yongqiang He, Guangdong (CN); Bojun Li, Guangdong (CN)

(73) Assignee: SHENZHEN SKYWORTH-RGB ELECTRONICS CO., LTD., Guangdong (CN)

( * ) Notice: Subject to any disclaimer, the term of this patent is extended or adjusted under 35 U.S.C. 154(b) by 485 days.

(21) Appl. No.: 15/780,549

(22) PCT Filed: Feb. 24, 2017

(86) PCT No.: PCT/CN2017/074807
§ 371 (c)(1),
(2) Date: May 31, 2018

(87) PCT Pub. No.: WO2018/129792
PCT Pub. Date: Jul. 19, 2018

(65) Prior Publication Data
US 2021/0027518 A1 Jan. 28, 2021

(30) Foreign Application Priority Data
Jan. 16, 2017 (CN) .......................... 201710028145.6

(51) Int. Cl.
*G06T 15/04* (2011.01)
*G06T 7/70* (2017.01)
(Continued)

(52) U.S. Cl.
CPC .............. *G06T 15/04* (2013.01); *G06F 3/011* (2013.01); *G06F 3/017* (2013.01); *G06F 3/167* (2013.01);
(Continued)

(58) Field of Classification Search
CPC .......... G06F 2111/18; G06F 3/011–015; G06F 3/0481; G06F 3/04817; G06F 9/4443;
(Continued)

(56) References Cited

U.S. PATENT DOCUMENTS 5,940,140 A * 8/1999 Dadourian ............... H04N 9/75
348/586
6,556,195 B1 * 4/2003 Totsuka .................. G06T 15/04
345/419

(Continued)

FOREIGN PATENT DOCUMENTS

CN  102486872      6/2012
CN  102486872 A  * 6/2012
(Continued)

OTHER PUBLICATIONS

International search report dated May 10, 2017 from corresponding application No. PCT/CN2017/074807.

*Primary Examiner* — Todd Buttram
(74) *Attorney, Agent, or Firm* — Hauptman Ham, LLP (57) ABSTRACT

Disclosed are a VR playing method, a VR playing device, and a VR playing system. When using a media playing device for playing, a 3D spherical object is first created in the development environment, and then a new texture material is built and shader options are created for the texture material. After selecting shading for the texture material, a multimedia panoramic material is acquired from the media playing device or an external storage device, and then the texture material and the multimedia panoramic material are (Continued)

loaded onto the surface of the 3D spherical object. Finally, a virtual camera module is arranged at the center of the 3D spherical object. The angle of the virtual camera is controlled to pick up content of the multimedia panoramic material to play on the media playing device.

9 Claims, 4 Drawing Sheets

(51) Int. Cl.
*G06F 3/01* (2006.01)
*G06F 3/16* (2006.01)

(52) U.S. Cl.
CPC ...... *G06T 7/70* (2017.01); *G06T 2207/20048* (2013.01); *G06T 2215/12* (2013.01); *G06T 2215/16* (2013.01)

(58) Field of Classification Search
CPC .. G06F 3/04847; G06F 11/3664; G06F 3/012; G06F 3/0304; G06K 9/00664–00704; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 7,684,641 B1* | 3/2010 | Toksvig | G06T 11/40 382/274 |
| 8,363,928 B1* | 1/2013 | Sharp | H04N 7/18 382/154 |
| 2009/0058850 A1 | 3/2009 | Fun | |
| 2010/0091018 A1* | 4/2010 | Tatarchuk | G06T 15/005 345/423 |
| 2012/0010995 A1* | 1/2012 | Skirpa | G06F 16/9577 705/14.49 |
| 2014/0176607 A1 | 6/2014 | Yang et al. | |
| 2017/0068845 A1* | 3/2017 | Saito | G06K 9/00288 |
| 2019/0339524 A1* | 11/2019 | Wang | G06T 15/20 |
| 2020/0035038 A1* | 1/2020 | Li | H04L 29/06 |

FOREIGN PATENT DOCUMENTS

| | | | |
|---|---|---|---|
| CN | 102568029 | | 7/2012 |
| CN | 104268939 | | 1/2015 |
| CN | 105654539 | | 6/2016 |
| CN | 106296819 | | 1/2017 |
| CN | 104268939 B | * | 2/2017 |

* cited by examiner

VR PLAYING METHOD, VR PLAYING DEVICE, AND VR PLAYING SYSTEM

RELATED APPLICATIONS

The present application is a National Phase of International Application Number PCT/CN2017/074807, filed Feb. 24, 2017, and claims the priority of China Application No. 201710028145.6, filed Jan. 16, 2017.

TECHNICAL FIELD

This disclosure relates generally to the technical field of virtual reality (VR), and more particularly relates to a VR playing method, a VR playing device, and a VR playing system.

BACKGROUND

In recent years, with the rapid development of virtual reality technology, various types of VR (virtual reality) related contents have also been gradually increasing. However, users currently can only view and experience VR contents on dedicated VR devices, and the existing VR devices have the following disadvantages.

First, most VR devices need to be purchased separately and are expensive.

Second, the visible area is small due to a limited screen size and device volume.

Third, although most devices are overall relatively lightweight, most of them require users to wear the device on the head such that the whole weight is borne by the head. In addition, the distance between the screen and the wearer's eyes is too close, which easily leads to dizziness and fatigue of the wearer.

SUMMARY

It is therefore one main object of this disclosure to provide a VR playing method, aiming to solve the technical problems that the dedicated VR devices are expensive, have a small visible area, and can easily cause the wearer to dizzy and fatigue.

To achieve the above objective, the VR playing method provided by this disclosure includes the following operations. A 3D spherical object is first created in a development environment. A new texture material is built and shader options are created for the texture material. Then a multimedia panoramic material is obtained, and the texture material together with the multimedia panoramic material is loaded onto the surface of the 3D spherical object. A virtual camera module then is arranged in the center of the 3D spherical object, and an angle of the virtual camera is controlled to pick up content of the multimedia panoramic material for playback on a media playing device.

Further, controlling the angle of the virtual camera to pick up the content of the multimedia panoramic material to play on the media playing device may include the following operations: tracking in real time a user's position information relative to the media playing device, calculating the user's viewing angle based on the position information, and adjusting the angle of the virtual camera in real time in accordance with the viewing angle to pick up the content of the multimedia panoramic material to play on the media playing device.

Further, creating the 3D spherical object in the development environment may include the following operations: establishing a world space coordinate system Of Transform with parameters of Position, Rotation, and Scale; setting (0,0,0) as the position of the center of the 3D spherical object in the world space coordinate system Of Transform; setting y-axis of the world space coordinate system Of Transform to rotate to 180 degrees; and setting a scale ratio of x-axis, y-axis, and z-axis of the world space coordinate system Of Transform to 1:10.

Further, subsequent to obtaining the multimedia panoramic material and loading the texture material and the multimedia panoramic material onto the surface of the 3D spherical object, the VR playing method may further include: determining whether x-axis attribute of the parameter Scale of the world space coordinate system Of Transform is negative, and performing inversion processing on the multimedia panoramic material if the x-axis attribute is not negative.

Further, the shader options may include Legacy Shaders, Transparent, Cutout, and Soft Edge Unlit.

Another objective of this disclosure is to provide a VR playing device applied to a media playing device. The VR playing device includes: a first creating module that creates a 3D spherical object in a development environment; a second creating module that creates a new texture material and that further creates shader options for the texture material; a loading module that obtains a multimedia panoramic material and loads the texture material and the multimedia panoramic material onto the surface of the 3D spherical object; and a pickup and playing module that arranges a virtual camera module in the center of the 3D spherical object, controls an angle of the virtual camera to pick up content of the multimedia panoramic material, and plays the content on a media playing device.

Further, the pickup and playing module is configured to track in real time a user's position information relative to the media playing device, calculate the user's viewing angle based on the position information, and adjust the angle of the virtual camera in real time in accordance with the viewing angle to pick up the content of the multimedia panoramic material to play on the media playing device.

Further, the first creating module includes: a Transform setup unit that establishes a world space coordinate system of Transform with parameters of Position, Rotation, and Scale; a first setting unit that sets (0,0,0) as the position of the center of the 3D spherical object in the world space coordinate system of Transform; a second setting unit that sets y-axis of the world space coordinate system of Transform to rotate to 180 degrees; and a third setting unit that sets a scale ratio of x-axis, y-axis, and z-axis of the world space coordinate system of Transform to 1:10.

Further, the VR playing device may further include: a determining module that determines whether x-axis attribute of the parameter Scale of the world space coordinate system of Transform is negative, and if the x-axis attribute is not negative, performs inversion processing on the multimedia panoramic material.

Further, the shader options may include Legacy Shaders, Transparent, Cutout, and Soft Edge Unlit.

This disclosure further provides a VR playing system, which includes the VR playing device as described above and a media playing device employing the VR playing device.

Further, the media playing device may include: a communication module that obtains a signal instruction transmitted by a smart device, and adjusts a display angle and a displayed area of the multimedia panoramic material according to the signal instruction; a wireless receiving module that receives a radio instruction transmitted by a wireless transmitting device, and adjusts a pickup angle, a pickup speed, and pickup content of the virtual camera module according to the radio instruction; a sensing and recognition module that acquires a user's gesture and controls the media playing device to respond to the gesture; a voice recognition module that receives a user's voice instruction and controls a playing status of the media playing device according to the voice instruction; and a switching module that switches between the communication module, the wireless receiving module, the sensing and recognition module, and the voice recognition module.

The VR playing method provided by this disclosure is applied to a media playing device. When using the media playing device for playing, a 3D spherical object is first created in the development environment, and then a new texture material is created, and shader options are created for the texture material. After selecting shading for the texture material, a multimedia panoramic material is acquired from the media playing device or an external storage device, and then the texture material and the multimedia panoramic material are loaded onto the surface of the 3D spherical object. Finally, a virtual camera module is arranged in the center of the 3D spherical object. By controlling the angle of the virtual camera, the content of the multimedia panoramic material is picked up and played on the media playing device.

According to the VR playing method of this disclosure, the multimedia panoramic material is loaded onto the surface of a spherical body, so that by adjusting the pickup angle of the virtual camera, each time the content of a rectangular area in the multimedia panoramic material can be picked up and then played on the media playing device, thereby avoiding the otherwise curved and incomplete display during direct viewing. Moreover, by adjusting the pickup angle, each area of the multimedia panoramic material can be viewed without limitation. Thus, the visible area is increased, while the cost of the VR experience is reduced. In addition, because the wearer needn't wear it, dizziness and fatigue wouldn't be caused.

BRIEF DESCRIPTION OF THE ACCOMPANYING DRAWINGS

To better illustrate the technical solutions that are reflected in various embodiments according to this disclosure or that are found in the prior art, the accompanying drawings intended for the description of the embodiments herein or for the prior art will now be briefly described. It is evident that the accompanying drawings listed in the following description show merely some embodiments of this disclosure, and that those having ordinary skill in the art will be able to obtain other drawings based on the arrangements shown in these drawings without making inventive efforts, where in these drawings.

DESCRIPTION OF REFERENCE NUMERALS

| Reference Numerals | Names |
| --- | --- |
| 100 | VR Playing system |
| 10 | VR Playing device |
| 11 | First Creating Module |
| 111 | Transform Setup Unit |
| 112 | First Setting Unit |
| 113 | Second Setting Unit |
| 114 | Third Setting Unit |
| 12 | Second Creating Module |
| 13 | Loading Module |
| 14 | Pickup and Playing module |
| 15 | Determining Module |
| 30 | Media playing device |
| 31 | Communication Module |
| 32 | Wireless Receiving Module |
| 33 | Sensing and Recognition Module |
| 34 | Voice Recognition Module |
| 35 | Switching Module |

Various implementations, functional features, and advantages of this disclosure will now be described in further detail in connection with some illustrative embodiments and the accompanying drawings.

DETAILED DESCRIPTION OF ILLUSTRATIVE EMBODIMENTS

It will be understood that the specific embodiments described herein are merely illustrative of the disclosure and are not intended to limit the disclosure.

This disclosure provides a VR playing method applied to a media playing device.

Figure 1:
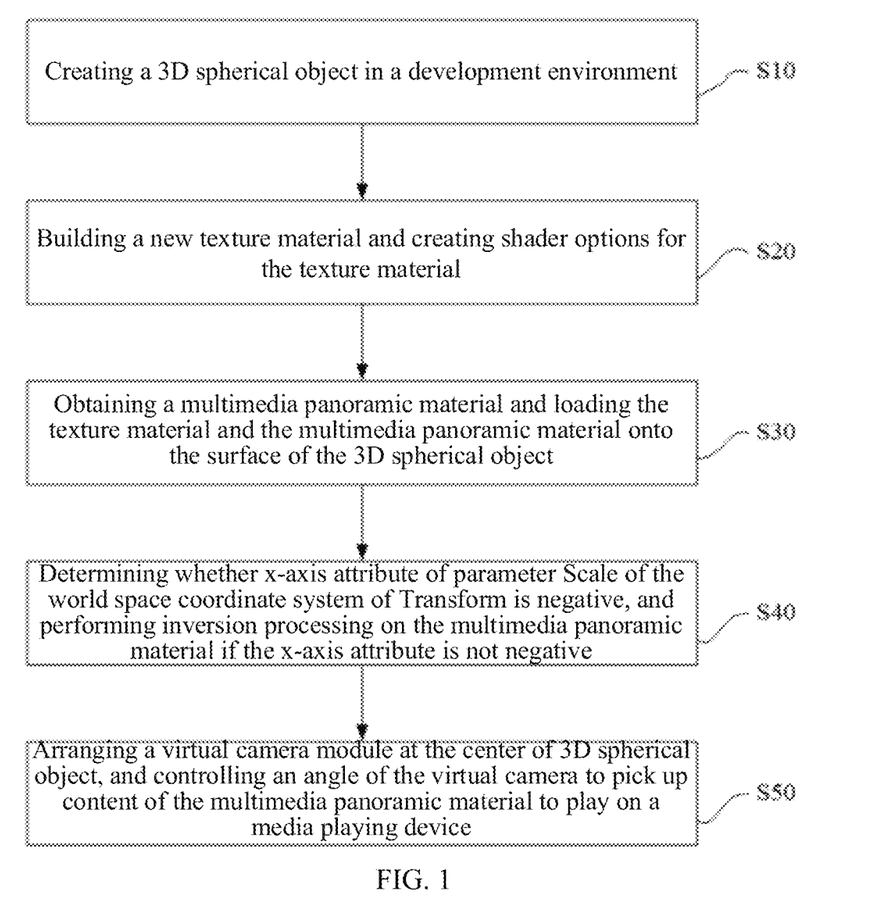
FIG. 1 is a flowchart of an illustrative embodiment of a VR playing method according to the disclosure.

FIG. 1 shows a flowchart of an illustrative embodiment of a VR playing method according to the disclosure.

In this embodiment, the VR playing method includes the following blocks S10 to S50.

In S10, a 3D spherical object is created in a development environment.

In S20, a new texture material is created, and shader options are created for the texture material.

In S30, a multimedia panoramic material is obtained, and then the texture material and the multimedia panoramic material are loaded onto the surface of the 3D spherical object.

In S50, a virtual camera module is arranged in the center of the 3D spherical object, and the angle of the virtual camera is controlled to pick up content of the multimedia panoramic material to play on the media playing device.

In this embodiment, the VR playing method is applied to a media playing device such as a television, a set-top box, or a video playback box. When the user wants to be engaged in a VR experience, a 3D spherical object can be created in the development environment of the media playing device. This operation can be accomplished in a system program of the media playing device, by adding program text to the system configuration, or by using a small plugin, so as to achieve the purpose of creating the 3D spherical object. After creating the 3D spherical object, a curtain further needs to be created for the 3D spherical object, namely, creating a new texture material and creating shader options for the texture material. Available forms of the shader options include Legacy Shaders, Transparent, Cutout, and Soft Edge Unlit. Different texture materials may be selected according to different playback scenes and playback contents. Then the user may import the multimedia data to be viewed using the VR into the media playing device, or import them into the media playing device in the previous steps. At this point, the media playing device will automatically obtain the location path of the multimedia panoramic material, and then load the multimedia panoramic material together with the texture material prepared in the above steps onto the surface of the 3D spherical object. When performing this operation, the multimedia panoramic material may first be attached to the surface of the 3D spherical object before pasting the texture material onto the outer surface of the multimedia panoramic material. Alternatively, the texture material may first be attached to the surface of the 3D spherical object before pasting the multimedia panoramic material onto the surface of the texture material. Finally, i.e., during viewing, a virtual camera module can be arranged in the center of the 3D spherical object to pick up the content of the multimedia panoramic material located on the surface of the 3D spherical object to play on the media playing device. The pickup angle of the virtual camera can be controlled in order to control the displayed content and display angle on the media playing device.

In other embodiments in which, e.g., a panoramic video is played on the media playing device using the VR playing method, a plug-in needs to firstly be installed on the media playing device prior to block S10 of the previous embodiment. Then the plug-in is used to create a spherical object in the development environment as a curtain carrier. The size of the curtain carrier can be set based on the resolution of the panoramic video. After the spherical curtain carrier is created, a new material is created and shader options are set to Legacy Shaders/Transparent/Cutout/Soft Edge Unlit for this material. Then the DUMMY texture is selected so that the media playing device when not playing will present a black screen, so as to provide a certain visual buffer for the user to avoid causing dizziness and fatigue. Then, the material created in the above steps and the panoramic video file would be imported onto the surface of the spherical object, and meanwhile the mirror script attached to the plug-in is added so that after the virtual camera module is arranged at the center of the spherical body the image content picked up by virtual camera module would not be inverted. Finally, the virtual camera module is arranged at the center of the spherical object; meanwhile, scripts such as control, path, audio, zoom, fast-forward, and brightness are added. As a result, 360-degree all-direction viewing is made possible during playback on the media playing device, which solves the problem of picture distortion and incompleteness that occurs when viewing the panoramic material directly with a common media playing device.

According to the VR playing method of this disclosure, the multimedia panoramic material is loaded onto the surface of the spherical body, so that by adjusting the pickup angle of the virtual camera, each time the content of a rectangular area in the multimedia panoramic material can be picked up and then played on the media playing device, thereby avoiding the curved and incomplete display during direct viewing. Moreover, by adjusting the pickup angle, each area of the multimedia panoramic material can be viewed without limitation. Thus, the visible area is increased, while the cost of the VR experience is reduced. In addition, because the wearer needn't wear it, dizziness and fatigue wouldn't be caused.

Further, controlling the angle of the virtual camera to pick up the content of the multimedia panoramic material to play on the media playing device may include the following operations: tracking in real time the user's position information relative to the media playing device, calculating the user's viewing angle based on the position information, and adjusting the angle of the virtual camera in real time in accordance with the viewing angle to pick up the content of the multimedia panoramic material to play on the media playing device.

Figure 2:
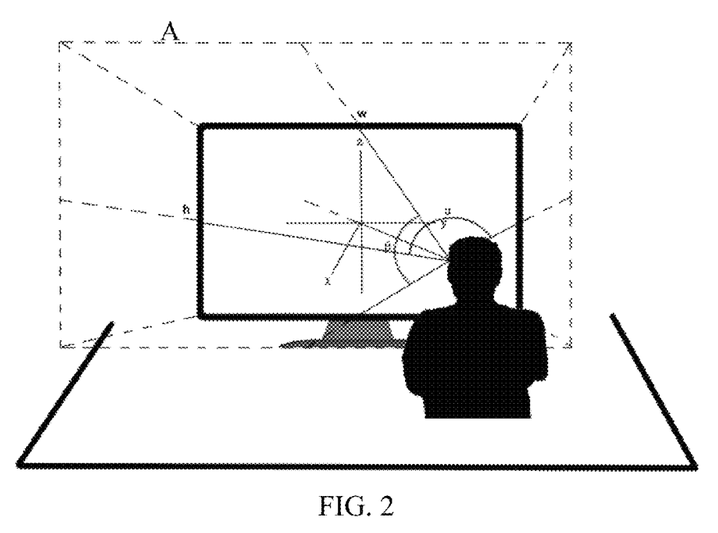
FIG. 2 is a schematic diagram illustrating a user's position relative to a media playing device according to the disclosure.

In this embodiment, in order to achieve the effect of playing the panoramic VR video using a conventional media playing device, the media playing device can obtain the user's position information and make output accordingly so that if the user changes his position the angle of the virtual camera will also be changed accordingly to pick up the content of the multimedia panoramic material, thereby furnishing better experience. Specifically, as illustrated in FIG. 2, the media playing device, such as a television set, tracks the user's position information relative to the television set in real time at a very high speed, and then calculates the user's viewing angle based on the position. The total time from the user moving to completion of the system response is controlled within 20 ms, while the frame rate stays above 60 Hz, so that the user would substantially experience no delay or stall. In addition, the media playing device can capture and track the user's activities within a very big range—the capture angle is not less than 150 degrees (exemplarily 180 degrees), and the effective distance lies in the range of 5 cm to 5 m with a recognition accuracy of higher than 1 cm. This ensures that any position of the user within the visible angles of the television screen can be accurately captured. After obtaining the user's position information (x, y, z) relative to the television set as well as the television screen size information (w, h), the user's present angle of view ($\alpha$, $\beta$) can be calculated. Then, based on the user's position and angle of view, the corresponding mapped panoramic video screen area (A) can be calculated; the area A is the image that should be displayed by the local television set. At this point, the angle of the virtual camera can be adjusted to pick up the image of the multimedia panoramic material that should be displayed, to play on the media playing device (television set).

Figure 3:
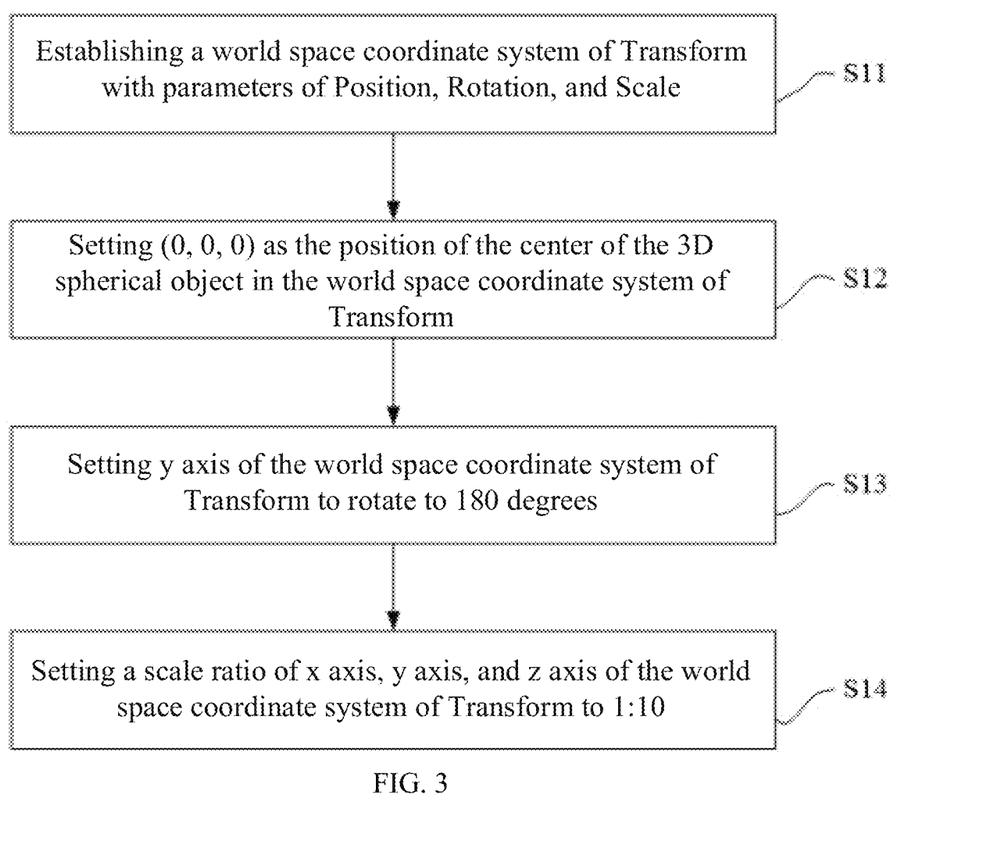
FIG. 3 is a detailed flowchart of block S10 of FIG. 1.

Further, as illustrated in FIG. 3, block S10 specifically includes the following operations S11 to S14 on the basis of the VR playing methods according to the above embodiments.

In S11, a world space coordinate system of Transform is established with parameters of Position, Rotation, and Scale.

In S12, coordinates (0, 0, 0) are set as the position of the center of the 3D spherical object in the world space coordinate system of Transform.

In S13, y-axis of the world space coordinate system of Transform is set to rotate to 180 degrees.

In S14, a scale ratio of x-axis, y-axis, and z-axis of the world space coordinate system of Transform is set to 1:10.

In this embodiment, whether the 3D spherical object is created directly in the development environment of the media playing device, or the spherical object is created in the development environment by means of a third-party plug-in, it is necessary to first establish a world space coordinate system of Transform with parameters of Position, Rotation, and Scale, and then set the position and angle of rotation and scale ratio of the 3D spherical object in the world space coordinate system of Transform so as to create the 3D spherical object. In this embodiment, coordinates (0, 0, 0) are set as the position of the center of the 3D spherical object in the world space coordinate system of Transform. In addition, to prevent inversion of the multimedia panoramic material loaded onto the surface of the 3D spherical object, the y coordinate axis of the world space coordinate system of Transform is set to rotate to 180 degrees so that the image of the multimedia panoramic material picked up by the virtual camera module when arranged at the center of the 3D spherical object would not be inverted. Meanwhile, to ensure that the image content of the multimedia panoramic material can be clearly viewed during viewing, the scale ratio of the x-axis, y-axis, and z-axis of the world space coordinate system of Transform is set to 1:10.

Further, as illustrated in FIG. 1, the VR playing methods according to the above embodiments may further include the following block S40 subsequent to block S30.

In S40, it is determined whether x-axis attribute of the parameter Scale in the world space coordinate system of Transform is negative, and if the x-axis attribute is not negative, inversion processing is performed on the multimedia panoramic material.

In this embodiment, after obtaining the multimedia panoramic material from the media playing device or from an external storage device inserted in the media playing device and loading the multimedia panoramic material and the texture material onto the surface of the 3D spherical object, it is required to determine whether the multimedia panoramic material is inverted. This is done by determining whether the x-axis attribute of the parameter Scale in the world space coordinate system of Transform is negative. If the x-axis attribute of the parameter Scale is negative, then it is determined that the multimedia panoramic material is not reversed and the content of the multimedia panoramic material picked up by the virtual camera module and played on the media playing device is presented as a normal non-inverted picture. Otherwise if the x-axis attribute of the parameter Scale is positive, it is determined that the multimedia panoramic material is reversed. Which means the content of the multimedia panoramic material picked up by the virtual camera module and played on the media playing device is presented as an inverted picture, and so the multimedia panoramic material needs to be inverted in order that the media playing device plays a normal multimedia panoramic picture.

This disclosure further provides a VR playing device.

Figure 4:
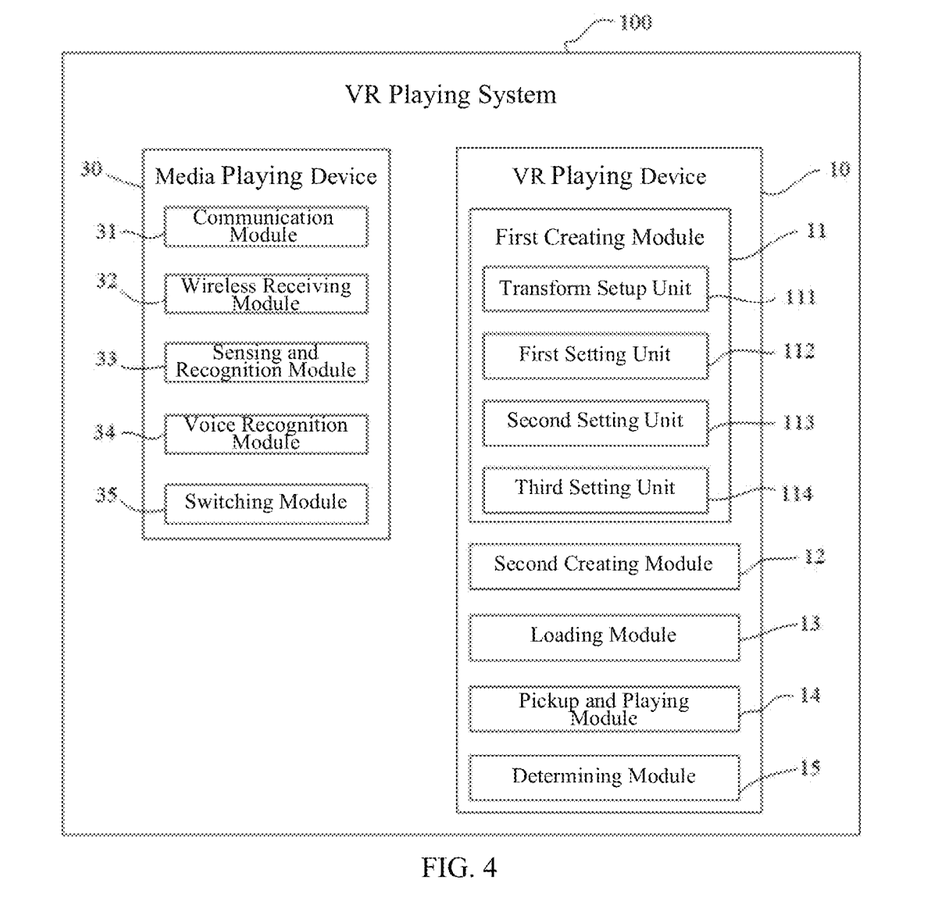
FIG. 4 is a block diagram of an illustrative embodiment of a VR playing system according to the disclosure.

As illustrated in FIG. 4, in this embodiment, the VR playing device 10 includes a first creating module 11, a second creating module 12, and a loading module 13.

The first creating module 11 is configured to create a 3D spherical object in a development environment.

The second creating module is configured to built a new texture material and further create shader options for the texture material.

The loading module 13 is configured to obtain a multimedia panoramic material and load the texture material and the multimedia panoramic material onto the surface of the 3D spherical object.

The pickup and playing module 14 is configured to arrange a virtual camera module in the center of the 3D spherical object, control the angle of the virtual camera to pick up content of the multimedia panoramic material, and play the content on a media playing device 30.

In this embodiment, the VR playing device 10 is applied to a media playing device 30 such as a television, a set-top box, or a video playback box. When the user wants to be engaged in a VR experience, the first creating module 11 can create a 3D spherical object in the development environment of the media playing device 30. This operation can be accomplished in a system program of the media playing device 30, by adding program text to the system configuration, or by using a small plug-in, so as to achieve the purpose of creating the 3D spherical object. After creating the 3D spherical object, a curtain further needs to be created for the 3D spherical object, namely, the second creating module 12 can built a new texture material and create shader options for the texture material. Available forms of the shader options include Legacy Shaders, Transparent, Cutout, and Soft Edge Unlit. Different texture materials may be selected according to different playback scenes and playback contents. Then the user may import the multimedia data to be viewed using the VR into the media playing device 30, or do so in the previous steps. At this point, the loading module 13 will automatically obtain the location path of the multimedia panoramic material, and then load the multimedia panoramic material together with the texture material prepared in the above steps onto the surface of the 3D spherical object. When performing this operation, the multimedia panoramic material may first be attached to the surface of the 3D spherical object before pasting the texture material onto the outer surface of the multimedia panoramic material. Alternatively, the texture material may first be attached to the surface of the 3D spherical object before pasting the multimedia panoramic material onto the surface of the texture material. Finally, i.e., during viewing, the pickup and playing module 14 can arrange a virtual camera module in the center of the 3D spherical object to pick up the content of the multimedia panoramic material located on the surface of the 3D spherical object to play on the media playing device 30. The pickup angle of the virtual camera can be controlled in order to control the displayed content and display angle on the media playing device.

In other embodiments in which, e.g., a panoramic video is played on the media playing device 30 using the VR playing method, the first creating module 11 needs to install a plug-in on the media playing device prior to block S10 of the previous embodiments. Then the plug-in is used to create a spherical object in the development environment as a curtain carrier. The size of the curtain carrier can be set based on the resolution of the panoramic video. After the spherical curtain carrier is created, the second creating module 12 builts a new material and sets the shader options to Legacy Shaders/Transparent/Cutout/Soft Edge Unlit for this material. Then the DUMMY texture is selected so that the media playing device 30 when not playing will present a black screen, so as to provide a certain visual buffer for the user to avoid causing dizziness and fatigue. Then, the loading module 13 imports the material built in the above steps and the panoramic video file onto the surface of the spherical object, and meanwhile adds the mirror script attached to the plug-in so that after the virtual camera module is arranged at the center of the spherical body the image content picked up by virtual camera module would not be inverted. Finally, the pickup and playing module 14 arranges the virtual camera module at the center of the spherical object, and meanwhile adds scripts such as control, path, audio, zoom, fast-forward, and brightness. As a result, 360-degree all-direction viewing is effected during playback on the media playing device 30, which solves the problem of picture distortion and incompleteness that occurs when viewing the panoramic material directly with a common media playing device.

According to the VR playing device 10 of this disclosure, the multimedia panoramic material is loaded onto the surface of a spherical body, so that by adjusting the pickup angle of the virtual camera, each time the content of a rectangular area in the multimedia panoramic material can be picked up and then played on the media playing device 30, thereby avoiding the curved and incomplete display during direct viewing. Moreover, by adjusting the pickup angle, each area of the multimedia panoramic material can be viewed without limitation. Thus, the visible area is increased, while the cost of the VR experience is reduced. In addition, because the wearer needn't wear it, dizziness and fatigue wouldn't be caused.

Further, the pickup and playing module 14 is configured to track in real time the user's position information relative to the media playing device, calculate the user's viewing angle based on the position information, and adjust the angle of the virtual camera in real time in accordance with the viewing angle to pick up the content of the multimedia panoramic material to play on the media playing device.

In this embodiment, in order to achieve the effect of playing the panoramic VR video using a conventional media playing device, the pickup and playing module 14 can obtain the user's position information and make output accordingly so that if the user changes his position the angle of the virtual camera will also be changed accordingly to pick up the content of the multimedia panoramic material, thereby furnishing better experience. Specifically, as illustrated in FIG. 2, the pickup and playing module 14, such as a local camera device and a television system of a television set, track the user's position information relative to the television set in real time at a very high speed, and then calculates the user's viewing angle based on the position. The total time from the user moving to completion of the system response is controlled within 20 ms, while the frame rate stays above 60 Hz, so that the user would substantially experience no delay or stall. In addition, the media playing device can capture and track the user's activities within a very big range—the capture angle is not less than 150 degrees (exemplarily 180 degrees), and the effective distance lies in the range of 5 cm to 5 m with a recognition accuracy of higher than 1 cm. This ensures that any position of the user within the visible angles of the television screen can be accurately captured. After obtaining the user's position information (x, y, z) relative to the television set as well as the television screen size information (w, h), the user's present angle of view (α, β) can be calculated. Then, based on the user's position and angle of view, the corresponding mapped panoramic video screen area (A) can be calculated; the area A is the image that should be displayed by the local television set. At this point, the angle of the virtual camera can be adjusted to pick up the image of the multimedia panoramic material that should be displayed, to play on the media playing device (television set).

Further, as illustrated in FIG. 4, the first creating module 11 includes a Transform setup unit 111, a first setting unit 112, a second setting unit 113, and a third setting unit 114.

The Transform setup unit 111 is configured to establish a world space coordinate system of Transform with parameters of Position, Rotation, and Scale.

The first setting unit 112 is configured to set (0, 0, 0) as the position of the center of the 3D spherical object in the world space coordinate system of Transform.

The second setting unit 113 is configured to set y-axis of the world space coordinate system of Transform to rotate to 180 degrees.

The third setting unit 114 is configured to set a scale ratio of x-axis, y-axis, and z-axis of the world space coordinate system of Transform to 1:10.

In this embodiment, whether the 3D spherical object is created directly in the development environment of the media playing device, or the spherical object is created in the development environment by means of a third-party plug-in, the Transform setup unit 111 needs to first establish a world space coordinate system of Transform with parameters of Position, Rotation, and Scale, and then the first setting unit 112, the second setting unit 113, and the third setting unit 114 would set respectively the position, the angle of rotation, and the scale ratio of the 3D spherical object in the world space coordinate system of Transform so as to create the 3D spherical object. In this embodiment, the first setting unit 112 sets the coordinates (0, 0, 0) as the position of the center of the 3D spherical object in the world space coordinate system of Transform. To prevent inversion of the multimedia panoramic material loaded onto the surface of the 3D spherical object, the second setting unit 113 sets the y coordinate axis of the world space coordinate system of Transform to rotate to 180 degrees so that the image of the multimedia panoramic material picked up by the virtual camera module when arranged at the center of the 3D spherical object would not be inverted. Meanwhile, to ensure that the image content of the multimedia panoramic material can be clearly viewed during viewing, the third setting unit sets the scale ratio of the x-axis, y-axis, and z-axis of the world space coordinate system of Transform to 1:10.

Further, as illustrated in FIG. 4, the VR playing device may further include a determining module 15 configured to determine whether x-axis attribute of the parameter Scale in the world space coordinate system of Transform is negative, and if the x-axis attribute is not negative, perform inversion processing on the multimedia panoramic material.

In this embodiment, after the loading module 13 obtains the multimedia panoramic material from the media playing device 30 or from an external storage device inserted in the media playing device 30 and loads the multimedia panoramic material and the texture material onto the surface of the 3D spherical object, it is required to determine whether the multimedia panoramic material is inverted. This is done by the determining module 15 determining whether the x-axis attribute of the parameter Scale of the world space coordinate system of Transform is negative. If the x-axis attribute of the parameter Scale is negative, then it is determined that the multimedia panoramic material is not reversed and the content of the multimedia panoramic material picked up by the virtual camera module and played on the media playing device 30 will be presented as a normal non-inverted picture. Otherwise if the x-axis attribute of the parameter Scale is positive, it is determined that the multimedia panoramic material is reversed. Which means the content of the multimedia panoramic material picked up by the virtual camera module and played on the media playing device 30 is presented as an inverted picture, and so the multimedia panoramic material needs to be inverted in order that the media playing device 30 plays a normal multimedia panoramic picture.

This disclosure further provides a VR playing system.

FIG. 4 is a block diagram of an illustrative embodiment of a VR playing system according to the disclosure.

In this embodiment, the VR playing system 100 includes the VR playing device 10 as described above and a media playing device 30 employing the VR playing device 10.

In this embodiment, the VR playing system 100 includes the VR playing device 10 as described above, and the media playing device 30 employing the VR playing device 10. The VR playing device 10 loads the multimedia panoramic material onto the surface of a spherical body, so that by adjusting the pickup angle of the virtual camera, each time the content of a rectangular area in the multimedia panoramic material can be picked up and then played on the media playing device 30, thereby avoiding the otherwise curved and incomplete display during direct viewing. Moreover, by adjusting the pickup angle, each area of the multimedia panoramic material can be viewed without limitation. Thus, the visible area is increased, while the cost of the VR experience is reduced. In addition, because the wearer needn't wear it, dizziness and fatigue wouldn't be caused.

Further, as illustrated in FIG. 4, the media playing device 30 may include a communication module 31, a wireless receiving module 32, a sensing and recognition module 33, and a voice recognition module 34, and a switching module 35.

The communication module 31 is configured to obtain a signal instruction transmitted by a smart device, and adjust a display angle and a displayed area of the multimedia panoramic material according to the signal instruction.

The wireless receiving module 32 is configured to receive a radio instruction transmitted by a wireless transmitting device, and adjust a pickup angle, a pickup speed, and pickup content of the virtual camera module according to the radio instruction.

The sensing and recognition module 33 is configured to acquire a user's gesture and control the media playing device to respond to the gesture.

The voice recognition module 34 is configured to receive a user's voice instruction and control a playing status of the media playing device according to the voice instruction.

The switching module 35 is configured to switch among the communication module 31, the wireless receiving module 32, the sensing and recognition module 33, and the voice recognition module 34.

In this embodiment, the media playing device 30 may be a television, a set-top box that works cooperatively with the television, or a video playback box. In order to increase the user's immersion and interactivity in experiencing the VR playing system, the media playing device is further provided with a communication module 31, a wireless receiving module 32, a sensing and recognition module 33, a voice recognition module 34, and a switching module 35 for seamless switching between the above-described modules thus meeting the needs of different groups of people. For example, sensors carried by a smart device such as a smart phone, a PAD, a smart watch, etc. can be used to acquire an angle change and a direction of rotation. The smart device then establishes a connection with the communication module 31 of the media playing device 30 through technical means including without limitation WiFi and Bluetooth, whereby the display angle and displayed area of the multimedia panoramic material on the media playing device can be adjusted according to the signal instructions such as the angle change, the direction of rotation, or the like. Another example is the use of some keys of a wireless transmitting device such as a remote controller to transmit radio instructions to the wireless receiving module 32 to adjust the pickup angle, the pickup speed, and the pickup content of the virtual camera module; for instance, the menu arrow keys can be used to facilitate the automatic rotation of the viewing perspective as well as the left and right directions of the rotation, the up/down direction keys can be used to adjust the viewing angle, and the numeric keys can be used to adjust the speed of the automatic rotation. For another example, a sensing and recognition module 33 may be additionally installed on the media playing device and can be used to acquire the user's gestures such as clicking and grabbing and further control the media playing device 30 to respond to the gestures, thereby accomplishing the operation on the VR system. The media playing device may further be equipped with a voice recognition module 34 for receiving a user's voice instruction and processing the voice instruction using a voice recognition algorithm, so as to achieve the purpose of controlling the playing status of the media playing device. In other embodiments, the media playing device may further be provided with a feedback device and a real-time report module, so as to provide a corresponding feedback for each user instruction, and report the system playing status in real time, thereby improving the interactivity of the VR playing system.

Furthermore, it is apparent to those having ordinary skill in the art that this disclosure also provides a VR playing device that includes a non-transitory program storage medium and one or more processors. The non-transitory program storage medium stores program instructions executable by the one or more processors to perform the various methods as described supra. Furthermore, it will be evident to those having ordinary skill in the art that various units or modules 11, 12, 13, 14, 15, 111, 112, 113, 114, 31, 32, 33, 34, and 35, as illustrated in FIG. 4, can be software modules or software units. In another aspect, it is well-known that various software modules or software units inherently can be stored in the non-transitory program storage medium and executed by the one or more processors.

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure.

What is claimed is:

1. A VR playing method, which being applied to a media player, the VR playing method comprising:
   establishing a world space coordinate system of transform with parameters of position, rotation, and scale;
   setting (0,0,0) as the position of the center of the 3D spherical object in the world space coordinate system of transform;
   setting y-axis of the world space coordinate system of transform to rotate to 180 degrees; and
   setting a scale ratio of x-axis, y-axis, and z-axis of the world space coordinate system of transform to 1:10;
   building a new texture material and creating shader options for the texture material;
   obtaining a multimedia panoramic material, and loading the texture material and the multimedia panoramic material onto the surface of the 3D spherical object;
   determining whether x-axis attribute of the parameter scale of the world space coordinate system of transform is negative, and performing inversion processing on the multimedia panoramic material if the x-axis attribute is not negative; and
   arranging a virtual camera at the center of the 3D spherical object, and controlling an angle of the virtual camera to pick up content of the multimedia panoramic material to play on the media player.

2. The VR playing method as claimed in claim 1, wherein controlling the angle of the virtual camera to pick up content of the multimedia panoramic material to play on the media player comprises:
   tracking in real time a user's position information relative to the media player, calculating the user's viewing angle based on the position information, and adjusting the angle of the virtual camera in real time in accordance with the viewing angle to pick up the content of the multimedia panoramic material to play on the media player.

3. The VR playing method as claimed in claim 1, wherein the shader options comprises legacy shaders, transparent, cutout and soft edge unlit.

4. A VR player, which being applied to a media player, the VR player comprising one or more processors and a non-transitory program storage medium containing program instructions executable by the one or more processors, the program instructions comprising:
　establishing a world space coordinate system of transform with parameters of position, rotation, and scale;
　setting (0,0,0) as the position of the center of the 3D spherical object in the world space coordinate system of transform;
　setting y-axis of the world space coordinate system of transform to rotate to 180 degrees; and
　setting a scale ratio of x-axis, y-axis, and z-axis of the world space coordinate system of transform to 1:10;
　building a new texture material and creating shader options for the texture material;
　obtaining a multimedia panoramic material and loading the texture material and the multimedia panoramic material onto the surface of the 3D spherical object;
　determining whether x-axis attribute of the parameter scale of the world space coordinate system of transform is negative, and performing inversion processing on the multimedia panoramic material if the x-axis attribute is not negative; and
　arranging a virtual camera at the center of the 3D spherical object, controlling an angle of the virtual camera to pick up content of the multimedia panoramic material, and playing the content on the media player.

5. The VR player as claimed in claim 4, wherein controlling an angle of the virtual camera to pick up content of the multimedia panoramic material to play on the media player comprises:
　tracking in real time a user's position information relative to the media player, calculating the user's viewing angle based on the position information, and adjusting the angle of the virtual camera in real time in accordance with the viewing angle to pick up and play the content of the multimedia panoramic material on the media player.

6. The VR player as claimed in claim 4, wherein the shader options comprise legacy shaders, transparent, cutout and soft edge unlit.

7. A VR playing system comprising a VR player and a media player that employs the VR player, the VR player comprising one or more processors and a non-transitory program storage medium containing program instructions executable by the one or more processors, the program instructions comprising:
　establishing a world space coordinate system of transform with parameters of position, rotation, and scale;
　setting (0,0,0) as the position of the center of the 3D spherical object in the world space coordinate system of transform;
　setting y-axis of the world space coordinate system of transform to rotate to 180 degrees; and
　setting a scale ratio of x-axis, y-axis, and z-axis of the world space coordinate system of transform to 1:10;
　building a new texture material and creating shader options for the texture material;
　obtaining a multimedia panoramic material and loading the texture material and the multimedia panoramic material onto the surface of the 3D spherical object;
　determining whether x-axis attribute of the parameter scale of the world space coordinate system of transform is negative, and performing inversion processing on the multimedia panoramic material if the x-axis attribute is not negative; and
　arranging a virtual camera in the center of the 3D spherical object, controlling an angle of the virtual camera to pick up content of the multimedia panoramic material, and playing the content on the media player.

8. The VR playing system as claimed in claim 7, wherein controlling an angle of the virtual camera to pick up content of the multimedia panoramic material to play on the media player comprises:
　tracking in real time a user's position information relative to the media player, calculating the user's viewing angle based on the position information, and adjusting the angle of the virtual camera in real time in accordance with the viewing angle to pick up and play the content of the multimedia panoramic material on the media player.

9. The VR playing system as claimed in claim 7, wherein the program instructions further comprises:
　obtaining a signal instruction, and adjusting a display angle and a displayed area of the multimedia panoramic material according to the signal instruction;
　receiving a radio instruction transmitted, and adjusting a pickup angle, a pickup speed, and picking up content of the virtual camera according to the radio instruction;
　acquiring a user's gesture and controlling the media player to respond to the gesture;
　receiving a user's voice instruction and controlling a playing status of the media player according to the voice instruction; and
　switching among a communicator, a wireless receiver, a sensor and recognizer, and a voice recognizer.

* * * * *